United States Patent
Oh

(10) Patent No.: US 8,213,098 B2
(45) Date of Patent: Jul. 3, 2012

(54) LENS DRIVING APPARATUS

(75) Inventor: Hyun-min Oh, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/021,913

(22) Filed: Feb. 7, 2011

(65) Prior Publication Data

US 2011/0205645 A1    Aug. 25, 2011

(30) Foreign Application Priority Data

Feb. 23, 2010 (KR) ........................ 10-2010-0016337

(51) Int. Cl.
*G02B 7/02* (2006.01)
(52) U.S. Cl. ........ 359/823; 359/819; 359/824; 359/694; 359/696; 359/703; 396/72; 396/73; 396/144; 396/349; 348/208.11
(58) Field of Classification Search .................. 359/694, 359/696, 702, 703, 705, 817, 819, 823–825; 396/72–75, 144, 349, 350, 529; 348/42, 348/208.11
See application file for complete search history.

(56) References Cited

U.S. PATENT DOCUMENTS

| | | | |
|---|---|---|---|
| 6,654,557 B2 * | 11/2003 | Kikuchi et al. | 396/144 |
| 7,068,929 B2 * | 6/2006 | Nomura | 396/73 |
| 7,079,761 B2 * | 7/2006 | Nomura | 396/72 |
| 7,097,367 B2 * | 8/2006 | Nomura | 396/349 |
| 7,433,137 B2 * | 10/2008 | Irisawa | 359/819 |
| 7,446,962 B2 * | 11/2008 | Matsumoto et al. | 359/819 |
| 7,576,931 B2 * | 8/2009 | Ishimasa et al. | 359/822 |
| 7,652,834 B2 * | 1/2010 | Ishimasa | 359/823 |
| 7,864,241 B2 * | 1/2011 | Iwasaki | 348/360 |
| 7,864,458 B2 * | 1/2011 | Sasaki | 359/819 |
| 7,916,414 B2 * | 3/2011 | Nakamura et al. | 359/824 |
| 2010/0134906 A1 * | 6/2010 | Nakamura et al. | 359/824 |
| 2011/0181743 A1 * | 7/2011 | Ando | 348/208.11 |

FOREIGN PATENT DOCUMENTS

JP    2725491    12/1997

* cited by examiner

*Primary Examiner* — Loha Ben
(74) *Attorney, Agent, or Firm* — Drinker Biddle & Reath LLP

(57) ABSTRACT

A method for driving a lens and a lens driving apparatus, the lens driving apparatus including a base in which a guide member is disposed; a lens support member comprising an installation unit disposed on one side thereof to slidingly move along the guide member, wherein at least one lens is mounted in the lens support member; a driving structure configured to move the lens support member and comprising a lead screw; a working member having one portion contacting the driving structure and another portion contacting one side of the installation unit; an elastic member for providing the installation unit with an elastic force; and wherein a predetermined space is disposed between the installation unit and the base, and wherein the installation unit is configured to be moved to the base by a means other than the driving structure.

11 Claims, 6 Drawing Sheets

LENS DRIVING APPARATUS

CROSS-REFERENCE TO RELATED PATENT APPLICATION

This application claims the benefit of Korean Patent Application No. 10-2010-0016337, filed on Feb. 23, 2010, in the Korean Intellectual Property Office, the entire disclosure of which is incorporated herein in by reference.

BACKGROUND OF THE INVENTION

1. Field of the Invention

Embodiments of the invention relate to a lens driving apparatus, and more particularly, to an apparatus for lessening a space for moving at least one lens.

2. Description of the Related Art

Many image capturing devices such as cameras include lenses for focusing. The focus is often controlled by adjusting relative distances between the lenses to focus the incident light from a subject onto an image capturing device of the camera. The lenses are often part of the camera.

Small-sized camera, such as a digital camera, are popular among consumers. As such, there is a demand for apparatuses that require little space, yet can move the lenses to focus the incident light from the subjects onto the image capturing device of the camera.

SUMMARY OF THE INVENTION

Therefore there is a need in the art for a lens driving apparatus, which includes a base in which a guide member is disposed; a lens support member comprising an installation unit disposed on one side thereof to slidingly move along the guide member, wherein at least one lens is mounted in the lens support member; a driving structure configured to move the lens support member and comprising a lead screw; a working member having one portion contacting the driving structure and another portion contacting one side of the installation unit; an elastic member for providing the installation unit with an elastic force; and wherein a predetermined space is disposed between the installation unit and the base, and wherein the installation unit is configured to be moved to the base by a means other than the driving structure.

The working member may include a clip member for contacting the lead screw; and a contact member having one portion contacting the clip member and another portion contacting the installation unit.

The clip member may move linearly in at least one direction on the lead screw according to the rotation of the lead screw.

The working member may include a first contact surface and a second contact surface, wherein the first contact surface and the second contact surface slidingly move on the guide member, are spaced apart from each other, and face each other.

The installation unit may include a first installation unit surface and a second installation unit surface that are spaced apart from each other and face each other, and wherein the first installation unit surface is disposed farther away from the base than the second installation unit surface and is disposed between the first contact surface and the second contact surface.

The lens support member may be configured to move independently from the working member when the lens support member is on the base.

The elastic member may be a compression spring.

The elastic member may be a tensile spring.

A method of driving at least one lens is disclosed. The method including if a lens support structure is above a base by greater than a predetermined distance, moving a driving structure to move a working member to move an installation unit, wherein the installation unit moves the lens support structure which includes the at least one lens; if the lens support structure is not above the base by greater than a predetermined distance, moving the lens support structure to the base with another driving structure, wherein the working member and the installation unit are slidingly attached to a guide member and wherein the working member moves the installation unit by coming into contact with and pushing the installation unit.

Moving a driving structure may include moving a lead screw that moves the driving structure to move a working member to move an installation unit, wherein the installation unit moves the lens support structure which includes the at least one lens, and wherein the driving structure moves linearly in at least one direction on the lead screw according to the rotation of the lead screw.

BRIEF DESCRIPTION OF THE DRAWINGS

The above and other features and advantages of embodiments of the invention will become more apparent by describing in detail exemplary embodiments thereof with reference to the attached drawings in which.

DETAILED DESCRIPTION

The objects and advantages of embodiments of the invention can be understood by the following description, and become apparent with reference to the embodiments of the invention described below. The invention may, however, be embodied in different forms and should not be construed as being limited to the embodiments set forth herein; rather, these embodiments are provided so that this disclosure will be thorough and complete, and will fully convey the concept of the invention to those of ordinary skill in the art. The terms used in the specification are merely used to describe particular embodiments, and are not intended to limit the invention. An expression used in the singular encompasses the expression of the plural, unless it has a clearly different meaning in the context. In the specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. While such terms as "first," "second," etc., may be used to describe various components, such components must not be limited to the above terms. The above terms are used only to distinguish one component from another.

Hereinafter, embodiments of the invention will be described more fully with reference to the accompanying drawings, in which exemplary embodiments of the invention are shown.

Figure 1:
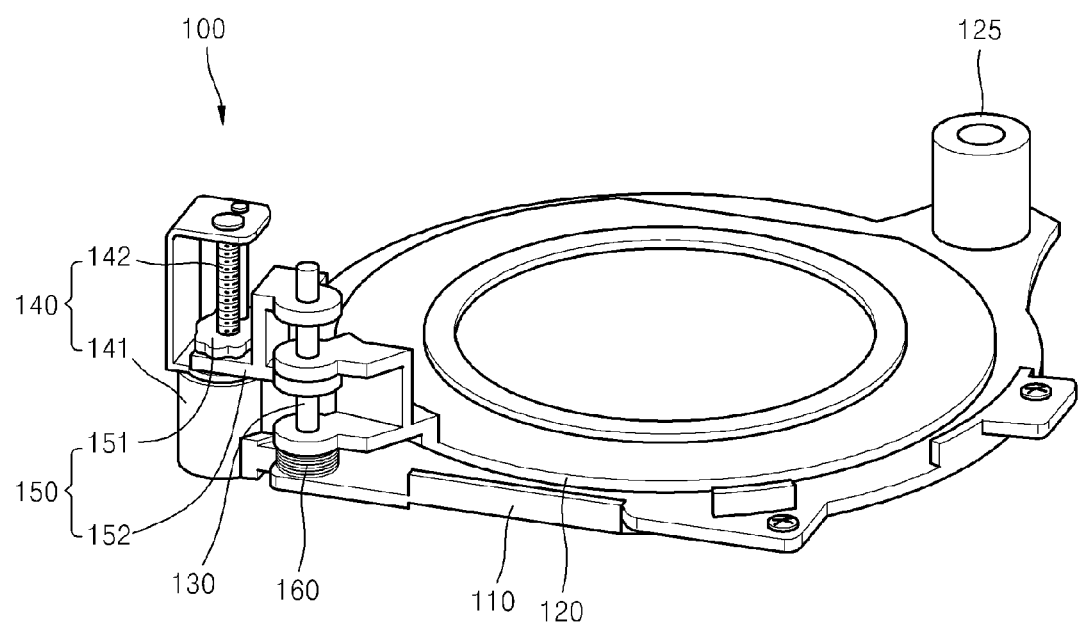
FIG. 1 is a schematic perspective view of a lens driving apparatus according to an embodiment of the invention.
Figure 2:
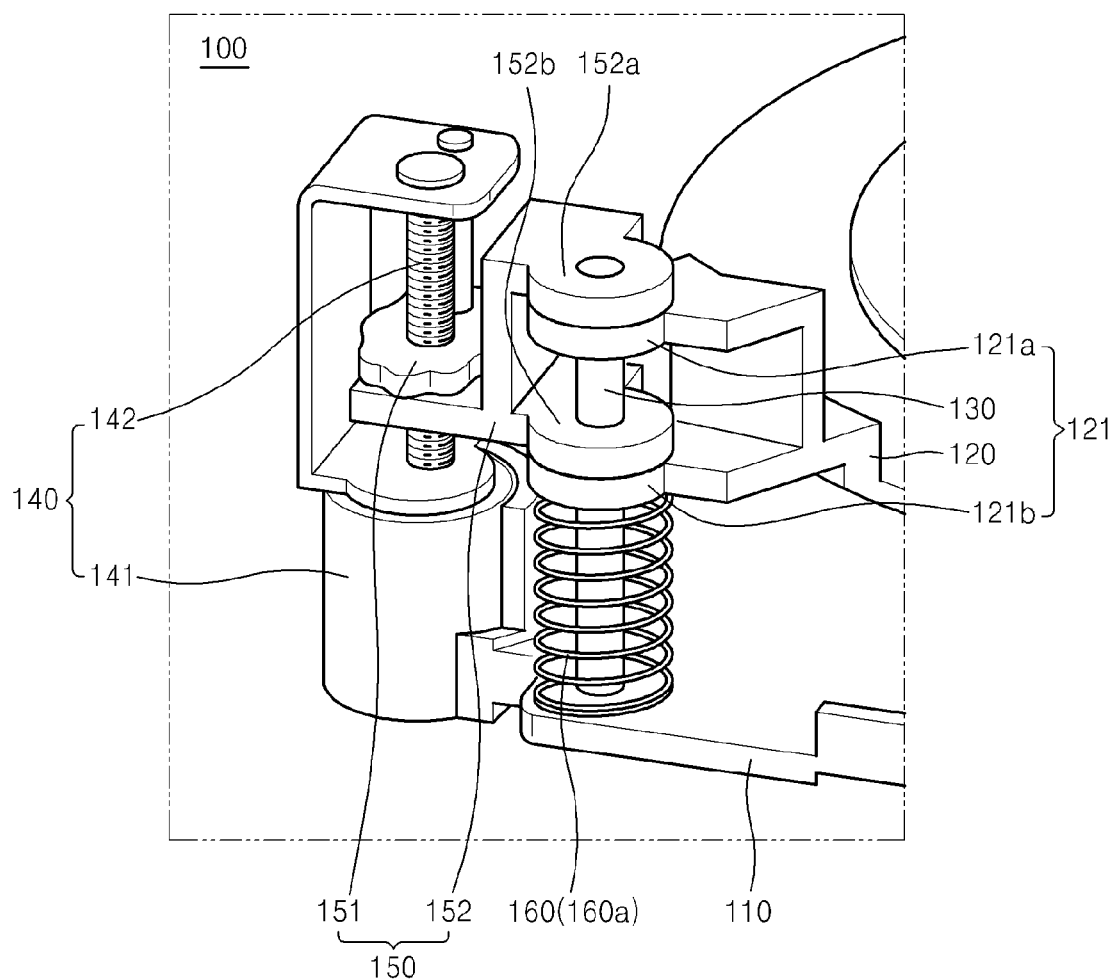
FIG. 2 is an enlarged perspective view of a lens driving apparatus according to an embodiment of the invention.

FIG. 1 is a schematic perspective view of a lens driving apparatus 100 according to an embodiment of the invention. FIG. 2 is an enlarged perspective view of the lens driving apparatus according to an embodiment of the invention.

The lens driving apparatus 100 of the present embodiment includes a base 110, a lens support member 120, a guide member 130, a driving means 140, a working member 150, and an elastic member 160.

The base 110 may be installed in a camera body. The lens support member 120 is installed in the base 110.

At least one lens group is mounted in the lens support member 120. A plurality of lenses may be mounted in the lens support member 120. For example, three-group zoom lens may be mounted in the lens support member 120. In this case, a rotation prevention bar (not shown) for preventing each group from rotating may be included in the lens support member 120.

The lens support member 120 may move in at least one direction, for example, in an axial direction, on the base 110. The axial direction indicates a direction of a center axis for lenses. The lens support member 120 moves upward so as to perform wide-angle photographing or telescopic photographing. When such a photographing is completely performed and the lens support member 120 is disposed on the base 110, the lens support member 120 moves downward.

The lens support member 120 includes an installation unit 121 that slidingly moves along the guide member 130. At least one installation unit 121 is formed in one side of the lens support member 120. The lens support member 120 moves in an axial direction through the installation unit 121. The installation unit 121 may be fixedly connected to the lens support member 120 or may be integrally formed with the lens support member 120.

The installation unit 121 includes a first installation unit surface 121a and a second installation unit surface 121b. The first installation unit surface 121a and the second installation unit surface 121b are spaced apart from each other by a predetermined gap and face each other. The first installation unit surface 121a and the second installation unit surface 121b are disposed on the guide member 130. The first installation unit surface 121a may be disposed between a first contact surface 152a and a second contact surface 152b of the working member 150. The second installation unit surface 121b may be disposed under the second contact surface 152b. The position relationship between the installation unit 121 and the working member 150 can reduce the overall length of the camera body during movement of the at least one lens. This will be described in detail with reference to FIGS. 4 through 6.

The guide member 130 may be disposed in a direction of the base 110, for example, in the axial direction. In this case, the guide member 130 may be fixedly connected to the base 110 or may be integrally formed with the base 110.

The driving means 140 moves the lens support member 120 in the axial direction. To this end, the driving means 140 includes a driving motor 141 and a lead screw 142.

The driving motor 141 may be fixed to a side surface of the base 110. Alternatively, the driving motor 141 may be installed in an upper portion of the base 110. The driving motor 141 provides the lead screw 142 with a driving force. The driving motor 141 may be, for example, a general motor or a gear embedded motor.

The lead screw 142 rotates by the driving force from the driving motor 141. The lead screw 142 may be mounted in a rotation shaft of the driving motor 141. A screw thread having a predetermined inclination is formed on an exterior surface of the lead screw 142.

Although a deceleration means is not disposed between a shaft of the driving motor 141 and the lead screw 142 in the present embodiment, the invention is not limited thereto. For example, the deceleration means disposed between the shaft of the driving motor 141 and the lead screw 142 may control a rotation speed of the lead screw 142.

A portion of the working member 150 contacts the lead screw 142 and another portion thereof contacts one side of the installation unit 121. To this end, the working member 150 may include a clip member 151 and a contact member 152.

The clip member 151 contacts the lead screw 142. A screw thread that is engaged with the screw thread of the lead screw 142 may be formed in the inner side surface of the clip member 151. In this case, the clip member 151 moves upward or downward according to the rotation of the lead screw 142.

A portion of the contact member 152 contacts the clip member 151 and another portion of the contact member 152 contacts the installation unit 121.

A portion of the contact member 152 moves upward or downward on the lead screw 142 according to the movement of the clip member 151.

Another portion of the contact member 152 slidingly moves on the guide member 130.

Another portion of the contact member 152 includes a first contact surface 152a and a second contact surface 152b that are spaced apart from each other by a predetermined gap and face each other. The first installation unit surface 121a is disposed between the first contact surface 152a and the second contact surface 152b.

The elastic member 160 provides the installation unit 121 with an elastic force in a direction. The elastic force is provided to the installation unit 121 in a direction away from the base 110, i.e. upward.

Meanwhile, the elastic force of the elastic member 160 may be provided to the contact member 152 through the installation unit 121 due to a structure in which at least one of the first installation unit surface 121a and the second installation unit surface 121b contacts at least one of the first contact surface 152a and the second contact surface 152b.

A compression spring or a tensile spring may be used as the elastic member 160. A compression spring 160a that is used as the elastic member 160 will now be described. A tensile spring 160b that is used as the elastic member 150 will be described with reference to FIG. 3.

The compression spring 160a may be disposed between the second installation unit surface 121b and the base 110. In this case, one end of the compression spring 160a is fixed to the base 110, and another end of the compression spring 160a may be fixed or may not be fixed to the second installation unit surface 121b. A restoration force of the compression spring 160a is latent when the lens support member 120 is disposed on the base 110, and moves the installation unit 121 upward when the clip member 151 moves upward.

Although the working member 150 includes the clip member 151 and the contact member 152 in the present embodiment, the invention is not limited thereto. For example, a screw thread that is engaged with the screw thread of the lead screw 142 may be formed in the partial inner side surface of the clip member 152.

Although the compression spring 160a is used as the elastic member 160 in the present embodiment, the invention is not limited thereto. A type and shape of the elastic member 160 are not limited since the elastic member 160a may be formed of a material that applies a force to the lens support member 120 in a direction, for example, upward.

Meanwhile, the elastic member 160 may correct a shake of the lens support member 120. When the lens support member 120 is accommodated or moved, the elastic member 160 may consume a fine shake of the lens support member 120.

Figure 3:
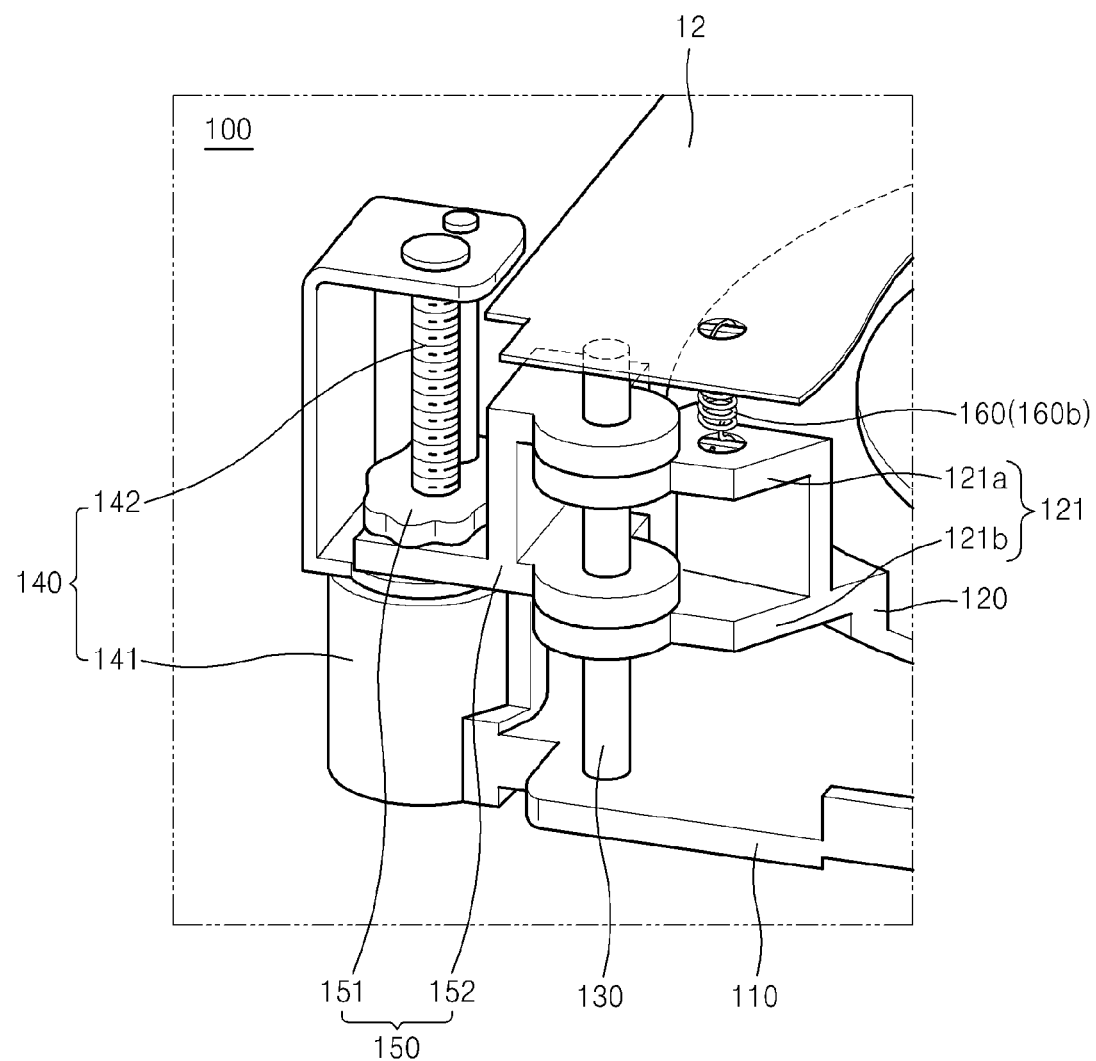
FIG. 3 is a schematic perspective view of a lens driving apparatus according to another embodiment of the invention.

FIG. 3 is a schematic perspective view of a lens driving apparatus according to another embodiment of the invention. A front surface cover assembly 12 of a camera is partially shown in FIG. 3 for the descriptive convenience.

A tensile spring 160b is used as the elastic member 160 in the present embodiment. Therefore, the base 110, the lens support member 120, the guide member 130, the driving means 140, and the working member 150 of the present embodiment are the same as described with reference to FIGS. 1 and 2 and thus the differences therebetween will now be described.

Referring to FIG. 3, the tensile spring 160b may be disposed between the first installation unit surface 121a and the front surface cover assembly 12. In this case, one end of the tensile spring 160b is fixed to the front surface cover assembly 12, and another end thereof is fixed to the first installation unit surface 121a.

A restoration force of the tensile spring 160b is latent when the lens support member 120 is disposed on the base 110, and moves the installation unit 121 of the lens support member 120 upward when the clip member 151 moves upward.

Hereinafter, an operation status of the lens driving apparatus 100 of a camera according to each mode will now be described with reference to the accompanying drawings. The lens driving apparatus 100 is driven according to a wide-angle photographing mode, a telescopic photographing mode, and a lens accommodation mode.

A first control signal used in the specification is applied to the driving motor 141 and controls the rotation of the driving motor 141. A second control signal used in the specification is applied to an adherence control motor 125 (see FIG. 1) and controls a force to closely adhere the lens support member 120 to the base 110. The first and second control signals are independent from each other.

The adherence control motor 125 (see FIG. 1) for controlling the movement of the lens support member 120 may be different from the driving motor 141. For example, an AF motor is used as the driving motor 141, and a DC motor may be used as the adherence control motor 125 (see FIG. 1) for controlling the lens support member 120. The adherence control motor 125 may drive the lens support member 120 by being in contact either directly or indirectly with the lens support member 120. The connection between the adherence control motor 125 and the support member 120 is not illustrated.

Figure 4:
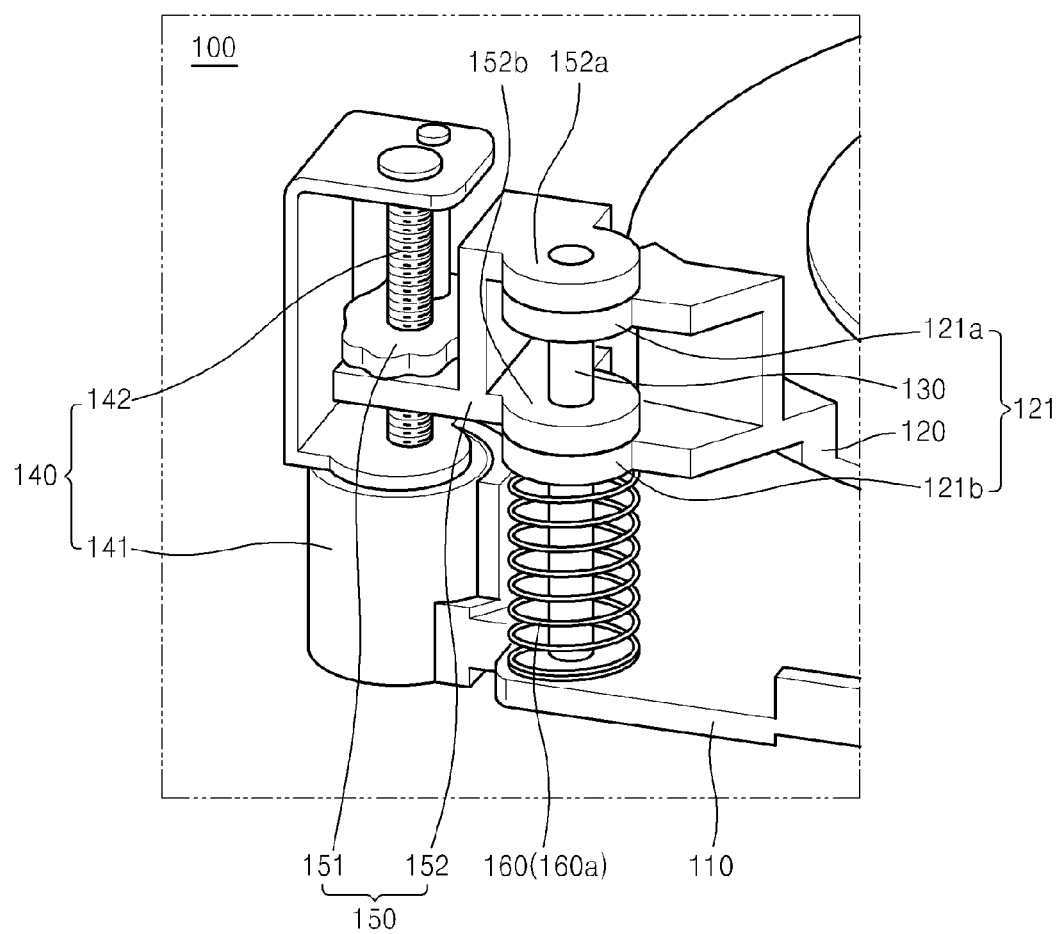
FIG. 4 illustrates an operating status of the lens driving apparatus of FIG. 2 in a telescopic photographing mode according to an embodiment of the invention.

FIG. 4 illustrates an operating status of the lens driving apparatus 100 in a telescopic photographing mode according to an embodiment of the invention. For the descriptive convenience, it is assumed that the lens support member 120 is disposed on the base 110 and is changed into the telescopic photographing mode.

The lead screw 142 coupled to a rotation shaft of the driving motor 141 rotates in a direction according to a first control signal for telescopic photographing. For example, the lead screw 142 may rotate clockwise or counterclockwise according to the direction of a screw thread.

The clip member 151 that is screwed with the lead screw 142 moves upward according to the rotation of the lead screw 142.

The movement of the clip member 151 results in a space in which the contact member 152 and the lens support member 120 move upward. Since a force to closely adhere the lens support member 120 to the base 110 is released by a second control signal, a restitution force of the compression spring 160a works on the installation unit 121. The installation unit 121 moves upward, and the contact member 152 contacts one of the first and second installation unit surfaces 121a and 121b according to the restitution force.

A distance $d_1$ between the first contact surface 152a and the second contact surface 152b and a distance $d_2$ between the first installation unit surface 121a and the second installation unit surface 121b may be identical to or different from each other.

For example, if the distances $d_1$ and $d_2$ are identical to each other, the contact member 152 and the installation unit 121 move upward by a force pushed by the compressing spring 160a. In this case, the first contact surface 152a and the first installation unit surface 121a contact each other, and the second contact surface 152b and the second installation unit surface 121b contact each other. The lens support member 120 moves upward according to the movement of the installation unit 121.

Meanwhile, if the distance $d_1$ is greater than the distance $d_2$, the contact member 152 and the lens support member 120 move upward when the second contact surface 152b and the second installation unit surface 121b contact each other.

Meanwhile, if the distance $d_1$ is smaller than the distance $d_2$, the contact member 152 and the lens support member 120 move upward when the first contact surface 152a and the first installation unit surface 121a contact each other.

Figure 5:
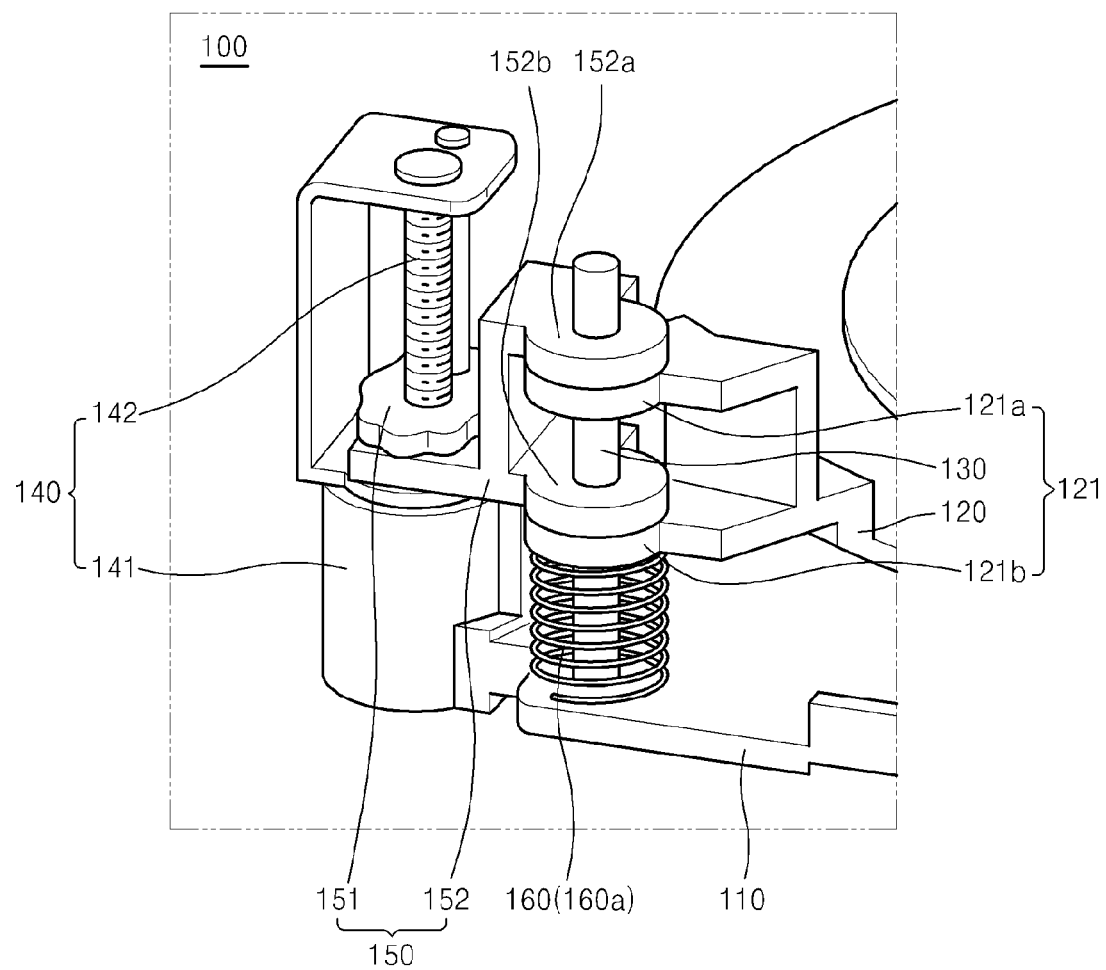
FIG. 5 illustrates an operating status of the lens driving apparatus of FIG. 2 in a wide-angle photographing mode according to an embodiment of the invention.

FIG. 5 illustrates an operating status of the lens driving apparatus of FIG. 2 in a wide-angle photographing mode according to an embodiment of the invention. For the descriptive convenience, it is assumed that the lens support member 120 is disposed on the base 110 and is changed into the wide-angle photographing mode.

In this case, a first control signal may not be generated. That is, a control signal may not be applied to the driving motor 141. In this case, a second control signal may release a force to closely adhere the lens support member 120 to the base 110.

Since a force applied to the lens support member 120 is released, a restitution force of the compression spring 160a is applied to the installation unit 121. The restitution force of the compression spring 160a may move the lens support member 120 upward.

The restitution force of the compression spring 160a is applied to the contact member 152 through the installation unit 121, but the contact member 152 may not move since the clip member 151 is not moved.

According to a structure in which the first installation unit surface 121a is disposed between the first contact surface 152a and the second contact surface 152b, the lens support member 120 may move upward without moving the contact member 152. Such a spatial efficiency increase can reduce the overall length of a camera body.

Although the first control signal is not generated in the present embodiment, the invention is not limited thereto. For example, the first control signal may be generated if necessary demands. However, in this case, the degree of rotation of the driving motor 141 according to the first control signal is smaller than that of the driving motor 141 for telescopic photographing.

Figure 6:
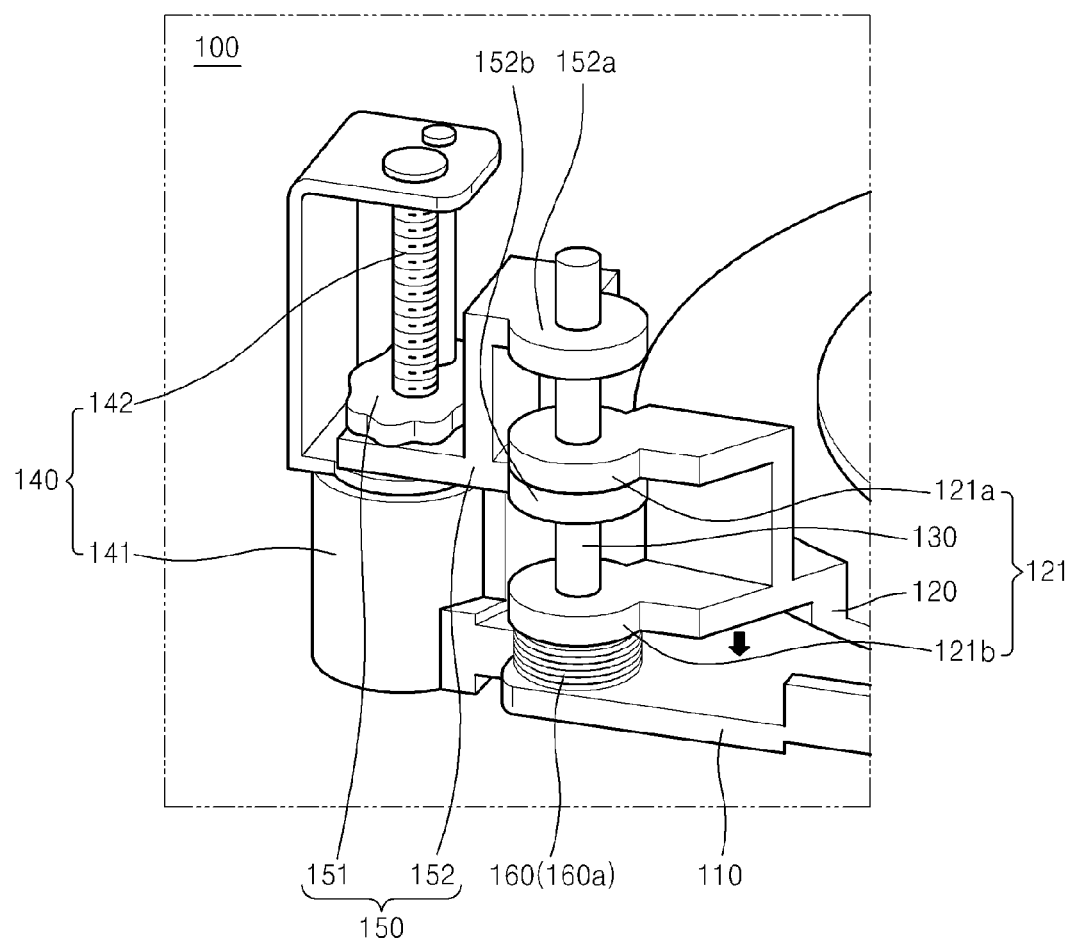
FIG. 6 illustrates an operating status of the lens driving apparatus of FIG. 2 in a lens accommodation mode according to an embodiment of the invention.

FIG. 6 illustrates an operating status of the lens driving apparatus of FIG. 2 in a lens accommodation mode according to an embodiment of the invention. Hereinafter, it will be described that the lens accommodation mode is changed to a wide angle photographing mode, for the descriptive convenience.

A force to closely adhere the lens support member 120 to the base 110 is generated according to a second control signal. That is, a force to push the lens support member 120 downward is generated. The lens support member 120 moves downward according to the force applied to the lens support member 120 and is closely adhered onto the base 110.

In this case, although a position of the contact member 152 does not change, the installation unit 121 moves downward in a sufficient space between the installation unit 121 and the base 110. Thus, it is unnecessary to rotate the lead screw 142. That is, the lead screw 142 is necessarily driven in a wide-angle photographing mode and a telescopic photographing mode.

Therefore, the overall length of the lead screw 142 necessary for moving the lens support member 120 can be reduced. Further, the overall length of a camera body can also be reduced.

When the lens support member 120 is disposed on the base 110, the distance $d_1$ between the first contact surface 152a and the second contact surface 152b and the distance $d_2$ between the first installation unit surface 121a and the second installation unit surface 121b may be identical to or different from each other. For example, if the distance $d_1$ and $d_2$ are identical to each other, the second contact surface 152b and the first installation unit surface 121a may contact to each other. Alternatively, if the distance $d_1$ and $d_2$ are different from each other, the second contact surface 152b and the first installation unit surface 121a may not contact to each other.

Although the compression spring 160a is used as the elastic member 160 in the embodiments of the wide-angle photographing mode, the telescopic photographing mode, and the lens accommodation mode, it will be understood by one of ordinary skill in the art that the tensile spring 160b is used as the elastic member 160 as shown in FIG. 3 in the embodiments of the wide-angle photographing mode, the telescopic photographing mode, and the lens accommodation mode.

In embodiments, the contact member 152 may have a different number than two contact surfaces, for example, one contact surface or three contact surfaces; and/or, the installation unit 121 may have a different number than two contact surface, for example one contact surface or three contact surfaces.

According to the invention, a structure that increases a space for moving a lens support member can make it possible to reduce the length of a lead screw and the inner space of a camera, thereby reducing an overall length of a camera body.

It will be understood by one of ordinary skill in the art that the concept and specific embodiment of the invention can be used as methods of achieving an objective similar to the invention. The elements shown in the drawings may be exaggerated or reduced for the convenience of description and thus the invention is not limited by the sizes or shapes thereof. It will be understood by one of ordinary skill in the art that various changes in form and details may be made therein without departing from the spirit and scope of the invention as defined by the following claims.

What is claimed is:

1. A lens driving apparatus comprising:
    a base in which a guide member is disposed;
    a lens support member comprising an installation unit disposed on one side thereof to slidingly move along the guide member, wherein at least one lens is mounted in the lens support member;
    a driving structure configured to move the lens support member and comprising a lead screw;
    a working member having one portion contacting the driving structure and another portion contacting one side of the installation unit; and
    an elastic member for providing the installation unit with an elastic force;
    wherein a predetermined space is disposed between the installation unit and the base, and wherein the installation unit is configured to be moved to the base by a means other than the driving structure.

2. The lens driving apparatus of claim 1, wherein the working member comprises:
    a clip member for contacting the lead screw; and
    a contact member having one portion contacting the clip member and another portion contacting the installation unit.

3. The lens driving apparatus of claim 2, wherein the clip member linearly moves in at least one direction on the lead screw according to the rotation of the lead screw.

4. The lens driving apparatus of claim 1, wherein the other portion of the working member comprises a first contact surface and a second contact surface, wherein the first contact surface and the second contact surface slidingly move on the guide member, are spaced apart from each other, and face each other.

5. The lens driving apparatus of claim 4, wherein the installation unit comprises a first installation unit surface and a second installation unit surface that are spaced apart from each other and face each other, and
    wherein the first installation unit surface is disposed farther away from the base than the second installation unit surface and is disposed between the first contact surface and the second contact surface.

6. The lens driving apparatus of claim 1, wherein the lens support member is configured to move independently from the working member when the lens support member is on the base.

7. The lens driving apparatus of claim 1, wherein the elastic member is a compression spring.

8. The lens driving apparatus of claim 1, wherein the elastic member is a tensile spring.

9. The lens driving apparatus of claim 1, wherein the installation unit is configured to move upward from the base without moving the working member for a predetermined distance before contacting the working member.

10. A method of driving at least one lens, the method comprising:
    if a lens support structure is above a base by a distance greater than a predetermined distance, moving a driving structure to move a working member to move an installation unit, wherein the installation unit moves the lens support structure which includes the at least one lens;
    if the lens support structure is not above the base by a distance greater than a predetermined distance, moving the lens support structure to the base with another driving structure,
    wherein the working member and the installation unit are slidingly attached to a guide member and wherein the working member moves the installation unit by coming into contact with and pushing the installation unit.

11. The method of claim 10, wherein moving the driving structure comprises:
moving a lead screw that moves the driving structure to move the working member to move the installation unit, wherein the installation unit moves the lens support structure which includes the at least one lens, and wherein the driving structure moves linearly in at least one direction on the lead screw according to the rotation of the lead screw.

* * * * *